United States Patent
Lou

(10) Patent No.: US 7,471,120 B2
(45) Date of Patent: Dec. 30, 2008

(54) CLOCK SWITCH FOR GENERATION OF MULTI-FREQUENCY CLOCK SIGNAL

(75) Inventor: Wenkwei Lou, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 43 days.

(21) Appl. No.: 11/748,510

(22) Filed: May 15, 2007

(65) Prior Publication Data

US 2008/0284484 A1  Nov. 20, 2008

(51) Int. Cl.
*G06F 1/08* (2006.01)
*H03K 17/00* (2006.01)

(52) U.S. Cl. .................... 327/99; 327/407; 327/408

(58) Field of Classification Search ............... 327/99, 327/298, 407, 408
See application file for complete search history.

(56) References Cited

U.S. PATENT DOCUMENTS

| | | | | |
|---|---|---|---|---|
| 5,357,146 A * | 10/1994 | Heimann | | 327/292 |
| 5,726,593 A * | 3/1998 | Ruuskanen | | 327/99 |
| 6,275,546 B1 * | 8/2001 | Miller et al. | | 375/354 |
| 6,429,698 B1 * | 8/2002 | Young | | 327/99 |
| 6,453,425 B1 * | 9/2002 | Hede et al. | | 713/501 |
| 6,472,909 B1 * | 10/2002 | Young | | 327/99 |
| 6,535,048 B1 * | 3/2003 | Klindworth | | 327/407 |
| 6,600,345 B1 * | 7/2003 | Boutaud | | 327/99 |
| 6,975,145 B1 * | 12/2005 | Vadi et al. | | 327/99 |

OTHER PUBLICATIONS

R. Mahmud, "Techniques to Make Clock Switching Glitch Free", EE Times, Jun. 26, 2003 (downloaded from http://www.eetimes.com on May 15, 2007).

* cited by examiner

*Primary Examiner*—Lincoln Donovan
*Assistant Examiner*—Adam Houston
(74) *Attorney, Agent, or Firm*—Fiala & Weaver

(57) ABSTRACT

An improved clock switch in an integrated circuit chip that multiplexes two asynchronous clock signals to generate a multi-frequency clock signal in a manner that avoids glitches on the clock output line and meta-stable states within the switch. The clock switch does not include a cross-coupled feedback loop, thus rendering the clock switch test-friendly and avoiding potential race conditions in the switch. The clock switch is useable with asynchronous clock sources having a variety of different clock frequencies and phases.

24 Claims, 9 Drawing Sheets

US 7,471,120 B2

CLOCK SWITCH FOR GENERATION OF MULTI-FREQUENCY CLOCK SIGNAL

BACKGROUND OF THE INVENTION

1. Field of the Invention

The invention generally relates to multi-frequency clocks. In particular, the invention is related to a clock switch in an integrated circuit chip that multiplexes asynchronous clock signals to generate a multi-frequency clock signal.

2. Background

Multi-frequency clocks are increasingly being used in integrated circuit chips to support a wide variety of applications. For example, a multi-frequency clock may be used to generate signals for varying the amount of vibration generated by a motor in a hand-held game controller or the intensity of an LED in an LED-based display. These clocks can also be used to conserve power in battery-operated devices such as cellular telephones, game controllers, Bluetooth® devices, or the like. In these devices, a multi-frequency clock can be used to provide an accurate high-speed clock during normal operation and to provide a less accurate low-speed clock for keeping system functions alive while operating in a power-saving mode. The low-speed clock consumes less power than the high-speed clock.

To generate a multi-frequency clock, it is often necessary to switch the source of a clock line while the chip is running. This is typically achieved by multiplexing two different frequency clock sources in hardware and controlling the multiplexer select line using internal logic.

In a clock switch that multiplexes two different frequency clock sources as described above, there is a risk of generating a "glitch" on the clock output line when switching from one clock source to the other. As used herein, the term "glitch" refers to irregular pulses generated on the clock output line of a clock switch that may or may not be interpreted as logic changes by other components internal or external to the chip. Such glitches are undesirable because they can cause functional errors to occur in sequential logic downstream of the clock switch.

FIG. 1 illustrates one conventional design for a clock switch that is designed to avoid glitches on the clock output line. In particular, FIG. 1 depicts a clock switch 100 that multiplexes two asynchronous clock sources ("CLK1" and "CLK2") to generate a multi-frequency clock output signal ("CLOCK_OUT") under the control of a clock selection signal ("SELECT").

Clock switch 100 avoids glitches in part through the inclusion of a cross-coupled feedback loop that ensures that the selection of either of the two clock sources can only occur after the other clock source has been de-selected. Because the cross-coupled feedback loop operates to combine signals from different clock domains, D flip-flops 102 and 106 are included along each clock selection path to perform a synchronization function. In particular, by respectively latching received data at the rising edge of CLK1 or CLK2, D flip-flops 102 and 106 operate to minimize potential meta-stability caused by the asynchronous nature of the SELECT signal, the feedback signals and the clock source signals.

Clock glitches are further avoided by clock switch 100 through the use of D flip-flops 104 and 108, which respectively operate to register the clock select signal at the negative edge of CLK1 or CLK2. This prevents changes from occurring at the output of the clock switch while either clock sources is at a high level, thereby avoiding chopping of the output clock.

FIG. 2 is a timing diagram 200 that shows the states of signals CLK1, CLK2, SELECT and CLOCK_OUT before, during, and after a change-over from clock source CLK1 to CLK2. As shown in FIG. 2, before a point in time indicated by dashed line 202 ("time 202"), SELECT is in a logic low state and CLOCK_OUT reflects the state of CLK1. At time 202, SELECT transitions to a logic high state. However, the propagation of CLK1 continues until a subsequent time 204 after a rising and falling edge of CLK1 due to the operation of D flip-flops 102 and 104. Then, propagation of CLK2 is started at a further subsequent time 206 after a rising and falling edge of CLK2 due to the further operation of D flip-flops 106 and 108.

Although conventional clock switch 100 avoids generating glitches on the clock output line, the design used by clock switch 100 presents certain disadvantages. For example, because clock switch 100 employs a cross-coupled feedback loop that interconnects each clock selection path, it is not test-friendly. Furthermore, the cross-coupled feedback loop may cause potential race conditions in the circuit. Additionally, conventional clock switch 100 requires reset pins on the D flip-flops in order to place the circuit into a known state.

What is needed, then, is an improved clock switch that avoids the foregoing disadvantages of conventional solutions. In particular, what is needed is a clock switch that multiplexes two asynchronous clock signals to generate a multi-frequency clock signal in a manner that avoids glitches on the clock output line and meta-stable states within the switch. The desired clock switch should not include a cross-coupled feedback loop, thus rendering the clock switch more test-friendly and avoiding potential race conditions in the switch. The desired clock switch should further be useable with asynchronous clock sources having a variety of different clock frequencies and phases.

BRIEF SUMMARY OF THE INVENTION

The present invention provides an improved clock switch that multiplexes two clock signals to generate a multi-frequency clock signal in a manner that avoids glitches on the clock output line and meta-stable states within the switch. In one aspect of the present invention, the clock switch does not include a cross-coupled feedback loop, thus rendering the clock switch more test-friendly and avoiding potential race conditions in the switch. In a further aspect of the present invention, the clock switch is useable with asynchronous clock sources having a variety of different clock frequencies and phases.

In particular, one embodiment of the present invention is a method for generating a multi-frequency clock signal. In accordance with the method, a first clock signal, a clock selection signal, and a feedback signal from a second clock selection circuit are received in a first clock selection circuit. A first clock selection signal is generated based on the state of the first clock signal, the clock selection signal, and the feedback signal. A second clock signal and the clock selection signal are received in the second clock selection circuit. A second clock selection signal is generated based only on the state of the second clock signal and the clock selection signal. The first clock signal, the second clock signal, the first clock selection signal and the second clock selection signal are received in a multiplexer. The multiplexer passes either the first clock signal or the second clock signal to a clock output based on the state of the first clock selection signal and the second clock selection signal. In accordance with the foregoing method, the first clock signal has a higher frequency than the second clock signal.

The first and second clock signals may be asynchronous.

Generating the first clock selection signal may include gating the propagation of the clock selection signal based on the state of the feedback signal, latching the clock selection signal on a rising edge of the first clock signal, and/or latching the clock selection signal on a falling edge of the first clock signal.

Generating the second clock selection signal may include latching the clock selection signal on a rising edge of the second clock signal and/or latching the clock selection signal on a falling edge of the second clock signal. In an embodiment in which the clock selection signal and the second clock signal are synchronous, generating the second clock selection signal may comprise only latching the clock selection signal on a falling edge of the second clock signal.

Another embodiment of the present invention is a clock switch for generating a multi-frequency clock. The clock switch includes a first clock selection circuit, a second clock selection circuit and a clock selection multiplexer. The first clock selection circuit is configured to receive a first clock signal, a clock selection signal, and a feedback signal from the second clock selection circuit and to generate a first clock selection signal based on the state of the first clock signal, the clock selection signal, and the feedback signal. The second clock selection circuit is configured to receive a second clock signal and the clock selection signal and to generate a second clock selection signal based only on the state of the second clock signal and the clock selection signal. The clock selection multiplexer is configured to receive the first clock signal, the second clock signal, the first clock selection signal and the second clock selection signal and to pass either the first clock signal or the second clock signal to a clock output based on the state of the first clock selection signal and the second clock selection signal. In accordance with the foregoing embodiment, the first clock signal has a higher frequency than the second clock signal.

The first and second clock signals may be asynchronous.

The first clock selection circuit may include a logic gate configured to gate the propagation of the clock selection signal based on the state of the feedback signal, at least one flip-flop that is configured to latch the clock selection signal on a rising edge of the first clock signal, and/or a flip-flop that is configured to latch the clock selection signal on a falling edge of the first clock signal.

The second clock selection circuit may include at least one flip-flop that is configured to latch the clock selection signal on a rising edge of the second clock signal, and/or a flip-flop that is configured to latch the clock selection signal on a falling edge of the second clock signal. In an embodiment in which the clock selection signal and the second clock signal are synchronous, the second clock selection circuit may consist of a flip-flop that is configured to latch the clock selection signal on a falling edge of the second clock signal.

Yet another embodiment of the present invention is a system for generating a multi-frequency clock signal. The system includes a first clock source configured to generate a first clock signal, a second clock source configured to generate a second clock signal that has a lower frequency than the first clock signal, and a clock switch circuit. The clock switch circuit includes a first clock selection circuit, a second clock selection circuit, and a clock selection multiplexer. The first clock selection circuit is configured to receive the first clock signal, a clock selection signal, and a feedback signal from a second clock selection circuit and to generate a first clock selection signal based on the state of the first clock signal, the clock selection signal, and the feedback signal. The second clock selection circuit is configured to receive the second clock signal and the clock selection signal and to generate a second clock selection signal based only on the state of the second clock signal and the clock selection signal. The clock selection multiplexer is configured to receive the first clock signal, the second clock signal, the first clock selection signal and the second clock selection signal and to pass either the first clock signal or the second clock signal to a clock output based on the state of the first clock selection signal and the second clock selection signal. In accordance with the foregoing embodiment, the first and second clock signals are asynchronous.

The first and second clock signals may be asynchronous.

The first clock selection circuit may include a logic gate configured to gate the propagation of the clock selection signal based on the state of the feedback signal, at least one flip-flop that is configured to latch the clock selection signal on a rising edge of the first clock signal, and/or a flip-flop that is configured to latch the clock selection signal on a falling edge of the first clock signal.

The second clock selection circuit may include at least one flip-flop that is configured to latch the clock selection signal on a rising edge of the second clock signal and/or a flip-flop that is configured to latch the clock selection signal on a falling edge of the second clock signal. In an embodiment in which the clock selection signal and the second clock signal are synchronous, the second clock selection circuit may consist of a flip-flop that is configured to latch the clock selection signal on a falling edge of the second clock signal.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
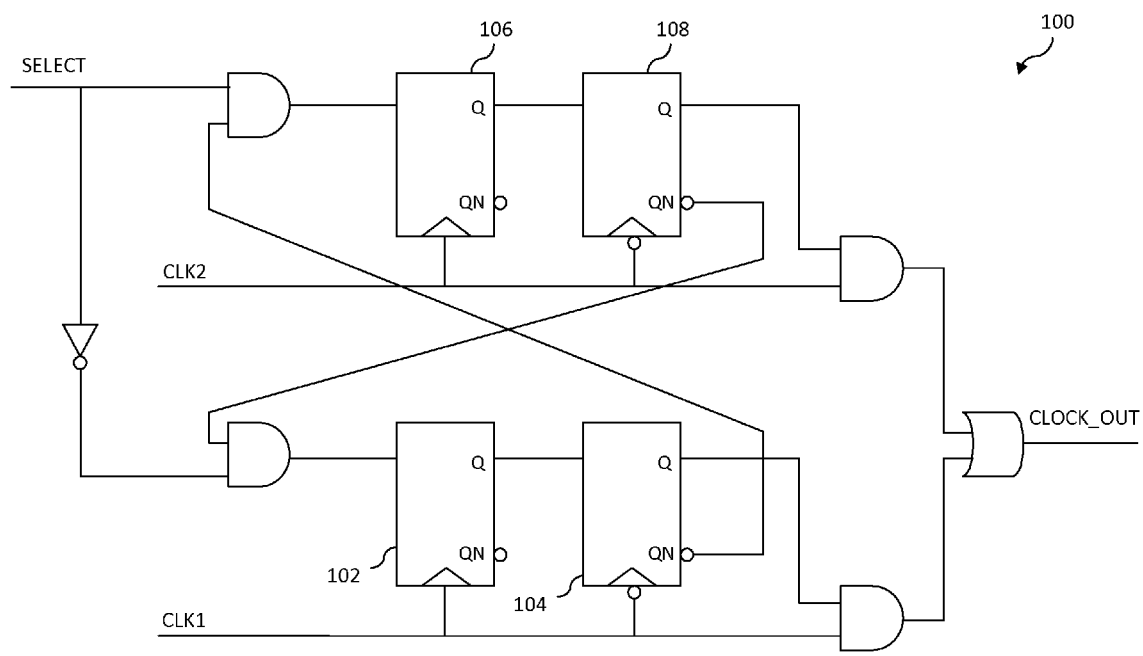
FIG. 1 is a block diagram of a conventional clock switch for generating a multi-frequency clock signal that is designed to avoid glitches on a clock output line.
Figure 2:
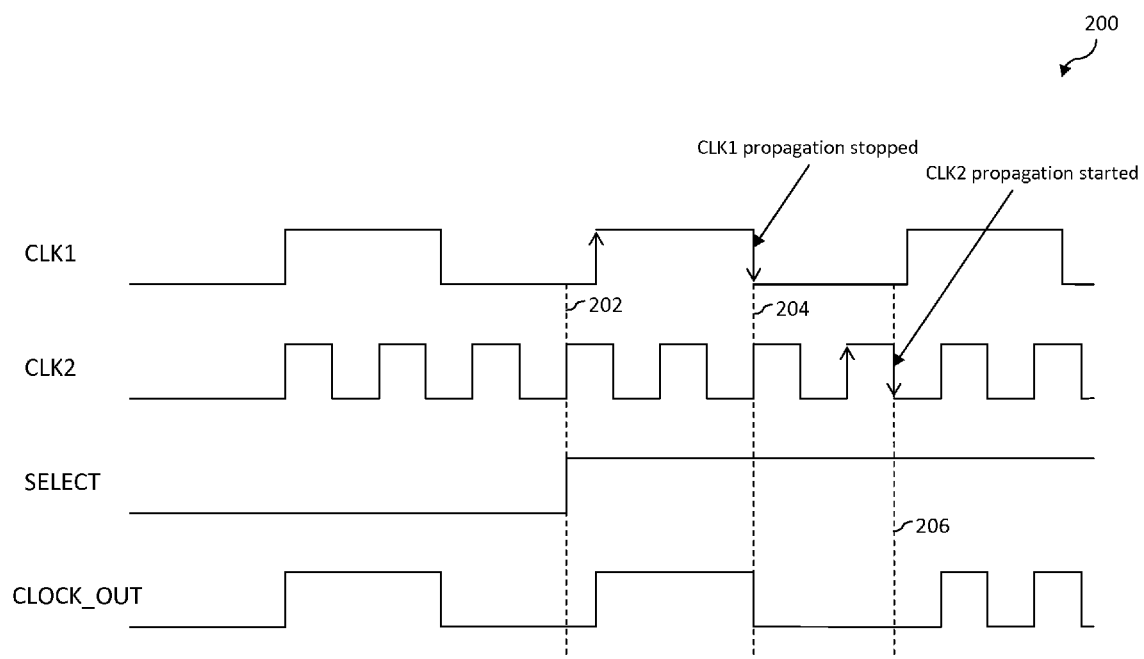
FIG. 2 is a diagram illustrating the state of various signals received or generated by the conventional clock switch of FIG. 1 over time.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Figure 3:
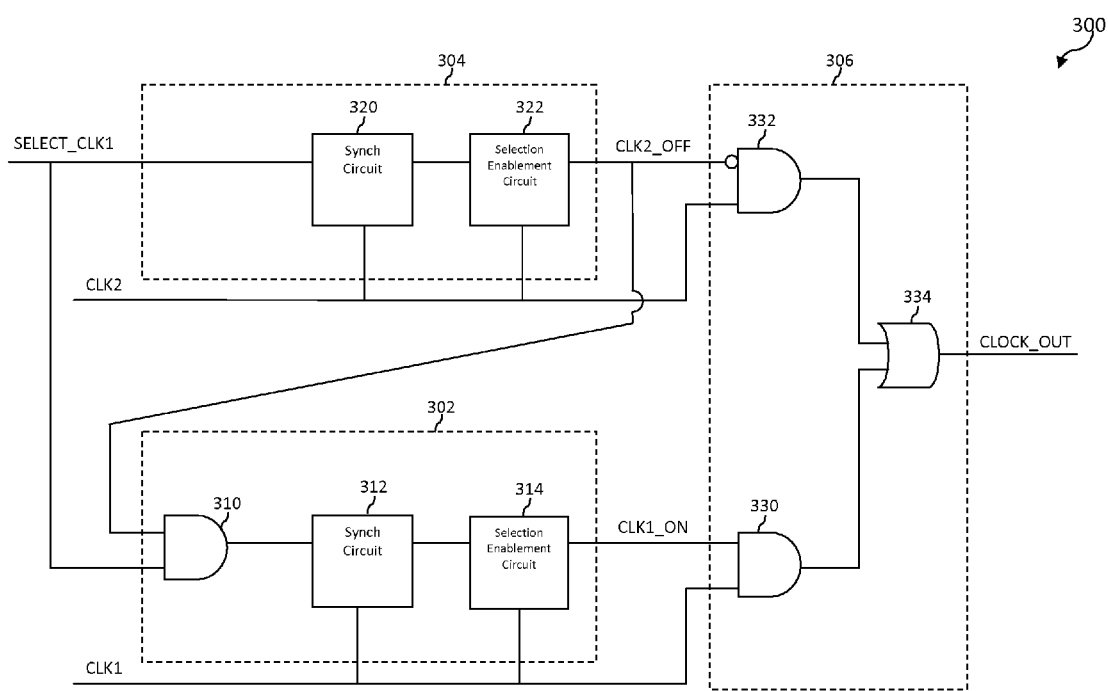
FIG. 3 is a block diagram of a clock switch for generating a multi-frequency clock signal in accordance with a first embodiment of the present invention.

A. Clock Switch in Accordance with a First Embodiment of the Present Invention FIG. 3 is a block diagram of a clock switch 300 in accordance with a first embodiment of the present invention. Clock switch 300 is configured to multiplex two asynchronous clock signals ("CLK1" and "CLK2") to generate a multi-frequency clock output signal ("CLOCK_OUT") under the control of a clock selection signal ("SELECT_CLK1"). In particular, clock switch 300 is configured such that when SELECT_CLK1 goes high, CLK1 will be selected as the clock output signal and when SELECT_CLK1 goes low, CLK2 will be selected as the clock output signal. Clock switch 300 is designed to be used in a system in which CLK1 has a higher frequency than CLK2.

As shown in FIG. 3, clock switch 300 includes a first clock selection circuit 302, a second clock selection circuit 304, and a clock selection multiplexer 306 connected to each of first and second clock selection circuits 302 and 304. First clock selection circuit 302 is configured to receive SELECT_CLK1, CLK1 and a feedback signal ("CLK2_OFF") from second clock selection circuit 304 as input signals and to generate an output signal ("CLK1_ON") based on the state of those input signals. Second clock selection circuit 304 is configured to receive SELECT_CLK1 and CLK2 as input signals and to generate output signal CLK2_OFF based on the state of those input signals. Clock selection multiplexer 306 is configured to receive CLK1, CLK2, CLK1_ON and CLK2_OFF as input signals and to generate CLOCK_OUT based on the state of those input signals.

It should be noted that although CLK2_OFF is fed back as an input signal to first clock selection circuit 302, no output signal from first clock selection circuit 302 is fed back as an input signal to second clock selection circuit 304. Consequently, clock switch 300 does not utilize a cross-coupled feedback loop as is used in prior art clock switches. Such cross-coupled feedback loops render prior art clock switches unfriendly for testing purposes and potentially generate race conditions in the switch.

The structure and operation of each of first clock selection circuit 302, second clock selection circuit 304 and clock selection multiplexer 306 will now be further described.

As shown in FIG. 3, first clock selection circuit 302 includes a logic gate 310, a synchronization circuit 312, and a selection enablement circuit 314 connected in a serial fashion. Logic gate 310 is configured to receive SELECT_CLK1 and CLK2_OFF as input signals and to generate an output signal based on the state of those input signals. In particular, logic gate 310 is configured to generate an output signal having a logic high state only when SELECT_CLK1 and CLK2_OFF are both in a logic high state. This has the beneficial effect of preventing CLK1 from being selected as the output clock until such time as the selection of CLK2 as the output clock has been disabled, thus avoiding glitches on the output of clock switch 300. In an embodiment, logic gate 310 is an AND gate. However, as will be appreciated by persons skilled in the relevant art(s), other logic elements can be substituted to perform the function of logic gate 310.

Synchronization circuit 312 is configured to receive the output of logic gate 310 and CLK1 as input signals and to latch the output of logic gate 310 in a manner that is dependent on CLK1. The purpose of synchronization circuit 312 is to stabilize the output of logic gate 310 before providing it to selection enablement circuit 314. This helps to minimize any meta-stability that may arise due to the asynchronous nature of signals CLK2_OFF, SELECT_CLK1 and CLK1. In an embodiment of the present invention, synchronization circuit 312 is a single flip-flop that is configured to latch the output of logic gate 310 on a rising edge of CLK1. In alternate embodiments, synchronization circuit 312 comprises two or more flip-flops connected in a serial fashion, the first of which is configured to latch the output of logic gate 310 on a rising edge of CLK1, and the remainder of which are configured to latch the output of the preceding flip-flop in the series on a rising edge of CLK1. As will be appreciated by persons skilled in the relevant art(s), the number of flip-flops used to implement synchronization circuit 312 may be varied to account for varying differences between the speeds of CLK1 and CLK2.

Selection enablement circuit 314 is configured to receive the output of synchronization circuit 312 and CLK1 as input signals and to latch the output of synchronization circuit 312 in a manner that is dependent on CLK1. In an embodiment of the present invention, selection enablement circuit 314 is a single flip-flop that is configured to latch the output of synchronization circuit 312 on a falling edge of CLK1. Latching the output of synchronization circuit 312 in this manner ensures that the propagation of CLK1 to the output of clock switch 300 is not turned off while CLK1 is at a high level, thereby avoiding chopping of the output clock. As shown in FIG. 3, the data latched within selection enablement circuit 314 is provided as the output signal CLK1_ON to clock selection multiplexer 306.

As further shown in FIG. 3, second clock selection circuit 304 includes a synchronization circuit 320 and a selection enablement circuit 322 connected in a serial fashion. Unlike first clock selection circuit 302, second clock selection circuit 304 is not configured to pass SELECT_CLK1 only upon receiving a feedback signal that indicates that the selection of the other clock source has been disabled. Since, as noted above, clock switch 300 is designed to be used in a system in which CLK1 is faster than CLK2, and since the disabling of the selection of CLK1 by first clock selection circuit 302 is driven by CLK1, it may be assumed that the disabling of the selection of CLK1 by first clock selection circuit 302 will always occur before second clock selection circuit 304 can enable the selection of CLK2. However, the number of registers used to implement synchronization circuit 312 of first clock selection circuit 302 and synchronization circuit 320 of second clock selection circuit 304 must be carefully chosen so that the delay imposed by synchronization circuit 312 does not so far exceed the delay imposed by synchronization circuit 320 so as to render this assumption untrue.

Synchronization circuit 320 is configured to receive SELECT_CLK1 and CLK2 as input signals and to latch SELECT_CLK2 in a manner that is dependent on CLK2. The purpose of synchronization circuit 320 is to stabilize SELECT_CLK1 before providing it to selection enablement circuit 322. This helps to minimize any meta-stability that may arise due to the asynchronous nature of signals SELECT_CLK1 and CLK2. In an embodiment of the present invention, synchronization circuit 320 is a single flip-flop that is configured to latch SELECT_CLK1 on a rising edge of CLK2. In alternate embodiments, synchronization circuit 320 comprises two or more flip-flops connected in a serial fashion, the first of which is configured to latch SELECT_CLK1 on a rising edge of CLK2, and the remainder of which are configured to latch the output of a preceding flip-flop in the series on a rising edge of CLK2.

Selection enablement circuit 322 is configured to receive the output of synchronization circuit 320 and CLK2 as input signals and to latch the output of synchronization circuit 320 in a manner that is dependent on CLK2. In an embodiment of the present invention, selection enablement circuit 322 is a single flip-flop that is configured to latch the output of synchronization circuit 320 on a falling edge of CLK2. Latching the output of synchronization circuit 320 in this manner ensures that the propagation of CLK2 to the output of clock switch 300 is not turned off while CLK2 is at a high level, thereby avoiding chopping of the output clock. As shown in FIG. 3, the data latched within selection enablement circuit 322 is provided as the output signal CLK2_OFF to clock selection multiplexer 306.

Clock selection multiplexer 306 includes a first logic gate 330, a second logic gate 332, and a third logic gate 334 connected to first and second logic gates 330 and 332. First logic gate 330 is configured to receive CLK1_ON and CLK1 as input signals and to generate an output signal based on the state of those input signals. In particular, first logic gate 330 is configured to generate an output signal having a logic high state only when CLK1_ON and CLK1 are both in a logic high state. This has the effect of passing CLK1 to logic gate 334 only when CLK1_ON has been placed in a logic high state by first clock selection path 302. In an embodiment, first logic gate 330 is an AND gate. However, as will be appreciated by persons skilled in the relevant art(s), other logic elements can be substituted to perform the function of first logic gate 330.

Second logic gate 332 is configured to receive CLK2_OFF and CLK2 as input signals and to generate an output signal based on the state of those input signals. As shown in FIG. 3, CLK2_OFF is received at an inverting input of logic gate 332. Second logic gate 332 is configured to generate an output signal having a logic high state only when CLK2_OFF is in a logic low state and CLK2 is in a logic high state. This has the effect of passing CLK2 to logic gate 334 only when CLK2_OFF has been placed in a logic low state by second clock selection path 304. In an embodiment, second logic gate 332 is an AND gate. However, as will be appreciated by persons skilled in the relevant art(s), other logic elements can be substituted to perform the function of second logic gate 332.

Third logic gate 334 is configured to receive the outputs of first logic gate 330 and second logic gate 332 as input signals and to generate an output signal based on the state of those input signals. In particular, third logic gate 334 is configured to generate an output signal having a logic high state when either of the outputs from first logic gate 330 or second logic gate 332 is in a logic high state. This has the effect of permitting either CLK1 (which is passed by logic gate 330 when CLK1_ON is high) or CLK2 (which is passed by logic gate 332 when CLK2_OFF is low) to control the output of third logic gate 334, which is the ultimate clock output signal CLOCK_OUT of clock switch 300.

Figure 4:
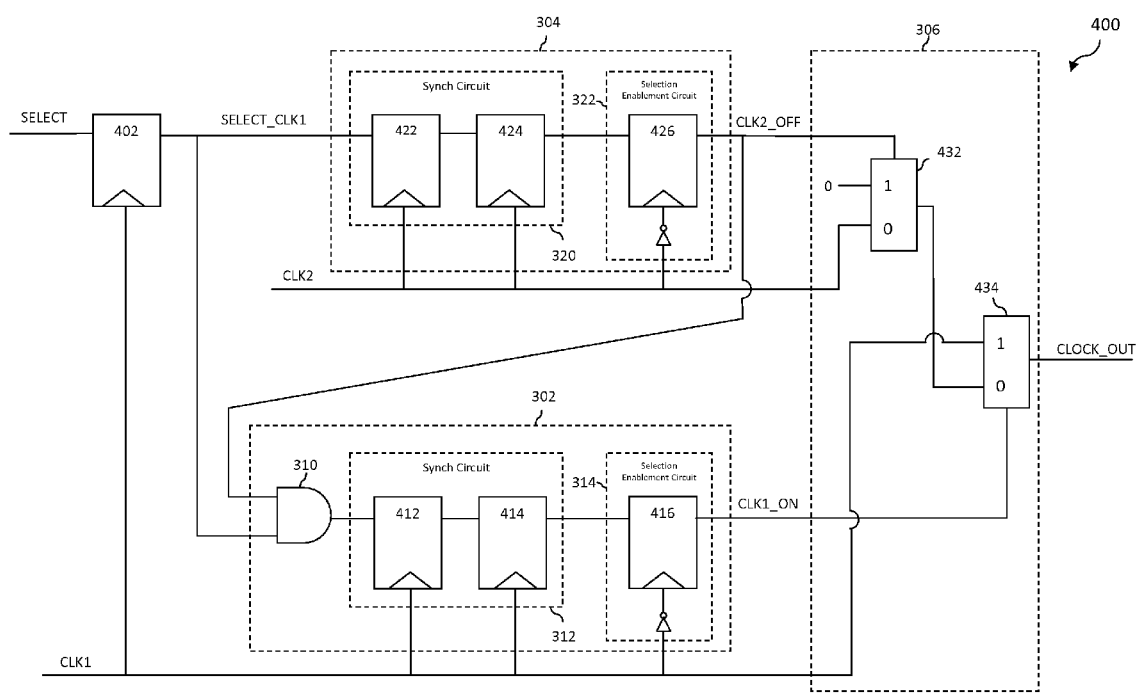
FIG. 4 is a block diagram that illustrates one manner of implementing the clock switch of FIG. 3.

FIG. 4 is a block diagram of a clock switch 400 that represents one manner of implementing clock switch 300 of FIG. 3. Clock switch 400 is described herein by way of example only and is not intended to limit the present invention.

As shown in FIG. 4, clock switch 400 includes a flip-flop 402 that is configured to generate SELECT_CLK1 by latching a clock selection signal ("SELECT") on a rising edge of CLK1. As a result, CLK1 and SELECT_CLK1 are synchronous signals. In one embodiment of the present invention, clock switch 400 is part of a processor-based system or device and CLK1 is the processor clock, or is otherwise derived from the processor clock.

As shown in FIG. 4, synchronization circuit 312 comprises a first flip-flop 412 and a second flip-flop 414 arranged in series, each of which is triggered by a rising edge of CLK1. This arrangement of flip-flops provides extra protection against any meta-stability that may arise due to the asynchronous nature of signals CLK2_OFF and CLK1. Likewise, synchronization circuit 320 comprises a first flip-flop 422 and a second flip-flop 424 arranged in series, each of which is triggered by a rising edge of CLK2. This arrangement of flip-flops provides extra protection against any meta-stability that may arise due to the asynchronous nature of signals SELECT_CLK1 and CLK2.

As further shown in FIG. 4, selection enablement circuit 314 is implemented as a single flip-flop 416 with an inverter coupled between CLK1 and the clock input of flip-flop 416. This ensures that flip-flop 416 will only latch the output of synchronization circuit 312 on a falling edge of CLK1. Likewise selection enablement circuit 322 is implemented as a single flip-flop 426 with an inverter coupled between CLK2 and the clock input of flip-flop 426. This ensures that flip-flop 426 will only latch the output of synchronization circuit 320 on a falling edge of CLK2.

In clock switch 400 of FIG. 4, clock selection multiplexer 306 is implemented using a first multiplexer 432 and a second multiplexer 434. First multiplexer 432 is configured to output CLK2 when CLK2_OFF is in a logic low state and to output a logic low signal when CLK2_OFF is in a logic high state. Second multiplexer 434 is configured to output the output of first multiplexer 432 when CLK1_ON is in a logic low state and to output CLK1 when CLK1_ON is in a logic high state. This arrangement is the logical equivalent of the arrangement of logic gates 330, 332 and 334 shown in FIG. 3.

Figure 5:
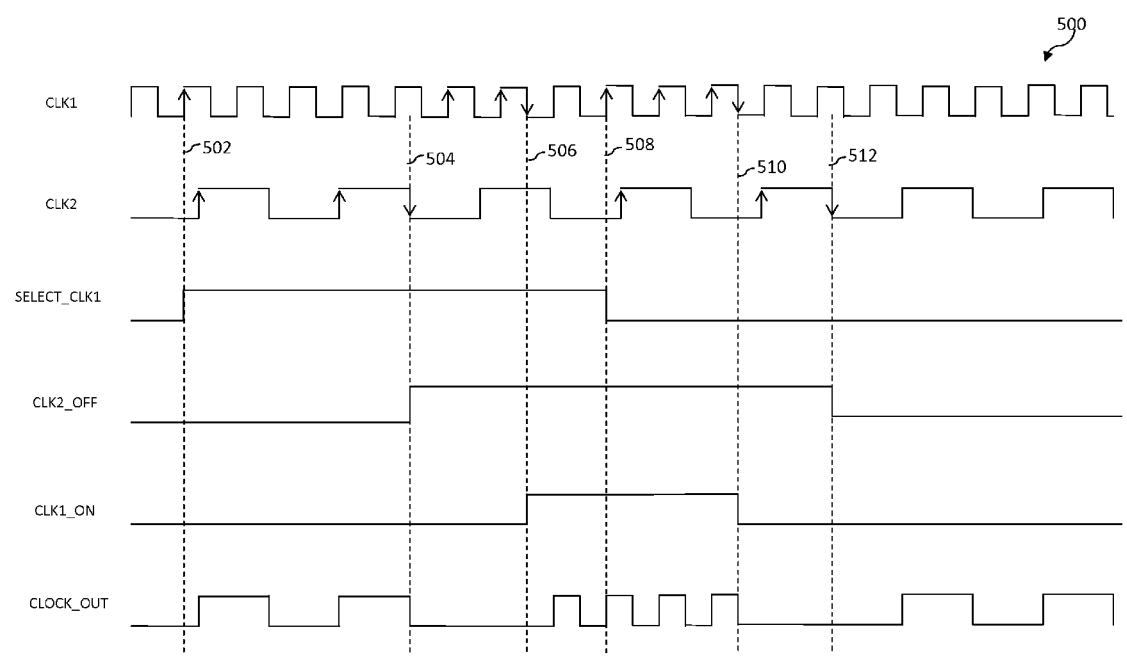
FIG. 5 is a diagram illustrating the state of various signals received or generated by the clock switch of FIG. 4 over time.

FIG. 5 is a timing diagram 500 that shows the states of signals CLK1, CLK2, SELECT_CLK1, CLK2_OFF, CLK1_ON and CLOCK_OUT during a change-over from slower clock source CLK2 to faster clock source CLK1 and then back to CLK2 again in clock switch 400 of FIG. 4. Timing diagram 500 is provided to aid in the understanding of the operation of clock switch 400 of FIG. 4.

As shown in FIG. 5, before a point in time indicated by dashed line 502 ("time 502"), SELECT_CLK1 is in a logic low state and CLOCK_OUT thus reflects the state of CLK2. At time 502, SELECT_CLK1 transitions to a logic high state on a rising edge of CLK1 due to the operation of flip-flop 402. However, when SELECT_CLK1 transitions to a logic high state at time 502, the state of CLOCK_OUT does not immediately change. Rather, the propagation of CLK2 to the output of clock switch 400 continues until a subsequent time 504 after two rising edges and one falling edge of CLK2 due to the operation of flip-flops 422, 424 and 426. At this point CLK2_OFF transitions to a logic high state, thereby disabling the propagation of CLK2 to the output of the clock switch. Then, propagation of CLK1 is started at a further subsequent time 506 after two rising edges and one falling edge of CLK1 due to the further operation of flip-flops 412, 414 and 416 responsive to CLK2_OFF going high. At this point, CLOCK_OUT begins reflecting the state of CLK1.

At a next point in time 508, SELECT_CLK1 transitions back to a logic low state on a rising edge of CLK1 due to the operation of flip-flop 402. However, when SELECT_CLK1 transitions to a logic low state at time 508, the state of CLOCK_OUT does not immediately change. Rather, the propagation of CLK1 to the output of clock switch 400 continues until a subsequent time 510 after two rising edges and one falling edge of CLK1 due to the operation of flip-flops 412, 414 and 416. At this point, CLK1_ON transitions to a logic low state, thereby disabling the propagation of CLK1 to the output of the clock switch.

After time 508, while SELECT_CLK1 is propagating through flip-flops 412, 414, and 416, it is also concurrently propagating through flip-flops 422, 424 and 426. This is due to the fact that there is no inhibiting feedback loop from first clock selection circuit 302 to second clock selection circuit 304. As a result, two rising edges and one falling edge of CLK2 after SELECT_CLK1 transitions to a logic low state at time 508, CLK2_OFF transitions to a logic low state at time 512. At this point, CLOCK_OUT begins reflecting the state of CLK2 again. Due to the design of clock switch 400, there is no chance that the selection of CLK2 will be enabled before the selection of CLK1 is disabled.

One additional benefit of the implementation of clock switch 400 shown in FIG. 4 is that reset pins are not required on the flip-flops as required by the prior art design discussed above in reference to FIG. 1. As long as the state of SELECT_CLK1 is known (and perhaps using a reset pin on its source, such as on flip-flop 402), then CLOCK_OUT will settle to a proper state via operation of circuit switch 400 itself when power is first applied.

Figure 6:
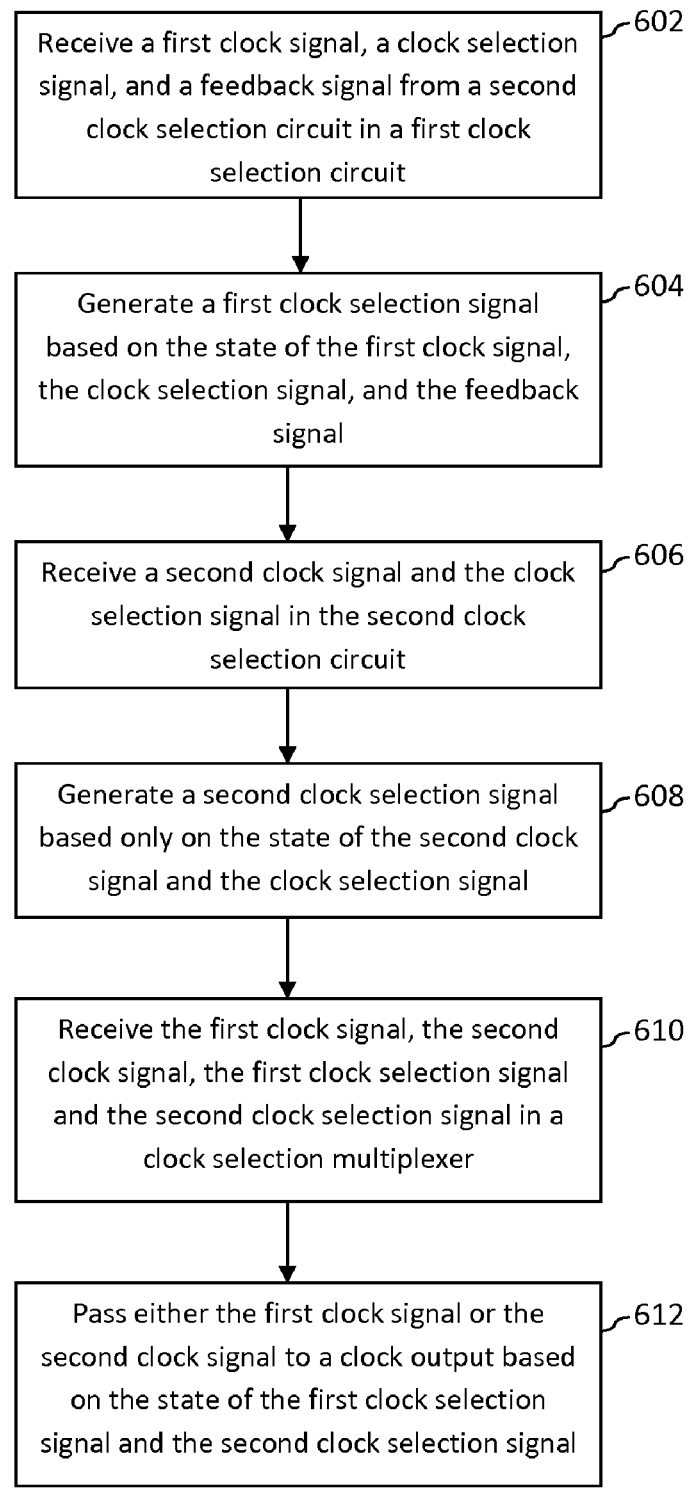
FIG. 6 depicts a flowchart of a method for generating a multi-frequency clock signal in accordance with embodiments of the present invention.

FIG. 6 depicts a flowchart 600 of a method for generating a multi-frequency clock signal in accordance with an embodiment of the present invention. As shown in flowchart 600, the method comprises a series of steps. However, persons skilled in the relevant art(s) will readily appreciate that the steps of flowchart 600 need not occur in a serial fashion and that such steps may occur concurrently or in some other order not shown in FIG. 6. The method of flowchart 600 will now be described with reference to clock switch 300 of FIG. 3 and clock switch 400 of FIG. 4, although the method is not limited to those implementations.

The method of flowchart 600 begins at step 602, in which a first clock selection circuit (first clock selection circuit 302) receives a first clock signal (CLK1), a clock selection signal (SELECT_CLK1) and a feedback signal (CLK2_OFF) from a second clock selection circuit (second clock selection circuit 304). At step 604, the first clock selection circuit (first clock selection circuit 302) generates a first clock selection signal (CLK1_ON) based on the state of the first clock signal (CLK1), the clock selection signal (SELECT_CLK1), and the feedback signal (CLK2_OFF).

At step 606, the second clock selection circuit (second clock selection circuit 304) receives a second clock signal (CLK2) and the clock selection signal (SELECT_CLK1). At step 608, the second clock selection circuit (second clock selection circuit 304) generates a second clock selection signal (CLK2_OFF) based only on the state of the second clock signal (CLK2) and the clock selection signal (SELECT_CLK1).

At step 610, a clock selection multiplexer (clock selection multiplexer 306) receives the first clock signal (CLK1), the second clock signal (CLK2), the first clock selection signal (CLK1_ON) and the second clock selection signal (CLK2_OFF). At step 612, the clock selection multiplexer (clock selection multiplexer 306) passes either the first clock signal (CLK1) or the second clock signal (CLK2) to a clock output (CLOCK_OUT) based on the state of the first clock selection signal (CLK1_ON) and the second clock selection signal (CLK2_OFF).

The foregoing method is applicable in an embodiment in which the first clock signal (CLK1) has a higher frequency than the second clock signal (CLK2). The method is particularly useful where the first clock signal (CLK1) and the second clock signal (CLK2) are asynchronous, although the invention is not limited to such an embodiment.

Step 604 of generating a first clock selection signal may include gating the propagation of the clock selection signal (SELECT_CLK1) by a logic gate (logic gate 310) based on the state of the feedback signal (CLK2_OFF). Step 604 may also include latching the clock selection signal (SELECT_CLK1) in one or more flip-flops (e.g., flip-flops 412 and 414) on a rising edge of the first clock signal (CLK1). Step 604 may further include latching the clock selection signal (SELECT_CLK1) in a flip-flop (e.g., flip-flop 416) on a falling edge of the first clock signal (CLK1).

Step 608 of generating a second clock selection signal may include latching the clock selection signal (SELECT_CLK1) in one or more flip flops (e.g., flip-flops 422 and 424) on a rising edge of the second clock signal (CLK2). Step 608 may also include latching the clock selection signal (SELECT_CLK1) in a flip-flop (e.g., flip-flop 426) on a falling edge of the second clock signal (CLK2).

Figure 7:
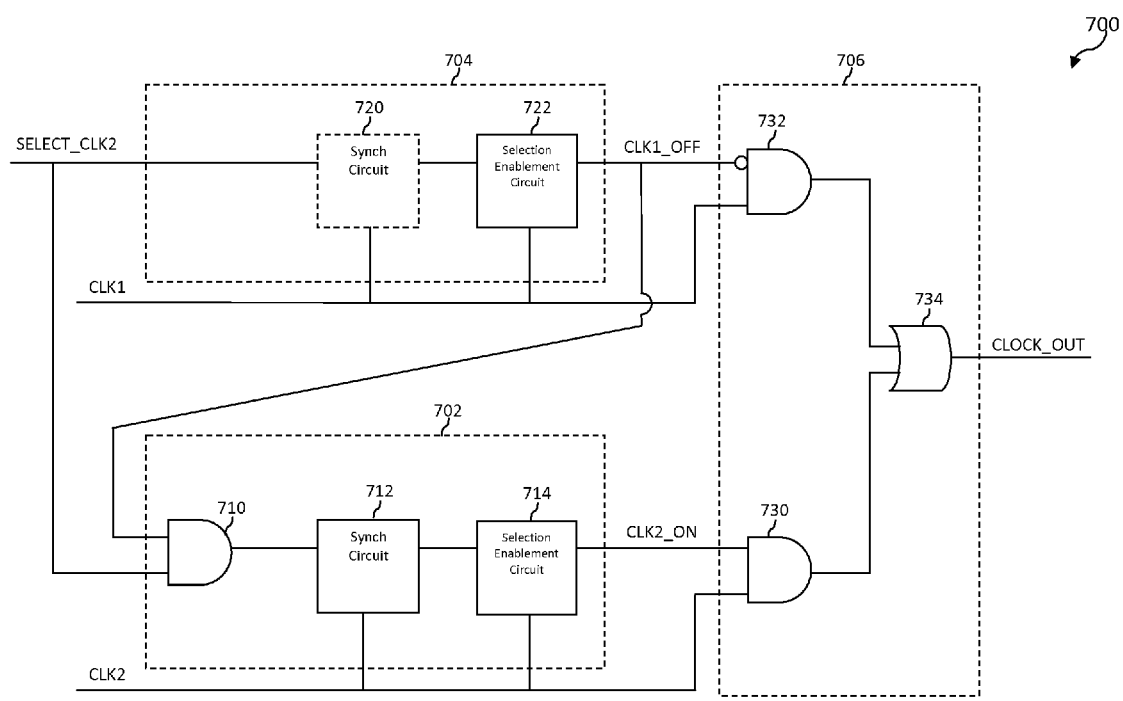
FIG. 7 is a block diagram of a clock switch for generating a multi-frequency clock signal in accordance with a second embodiment of the present invention.

B. Clock Switch in Accordance with a Second Embodiment of the Present Invention FIG. 7 is a block diagram of a clock switch 700 in accordance with a second embodiment of the present invention. Clock switch 700 is configured to multiplex two asynchronous clock signals ("CLK1" and "CLK2") to generate a multi-frequency clock output signal ("CLOCK_OUT") under the control of a clock selection signal ("SELECT_CLK2"). In particular, clock switch 700 is configured such that when SELECT_CLK2 goes high, CLK2 will be selected as the clock output signal and when SELECT_CLK2 goes low, CLK1 will be selected as the clock output signal. Clock switch 700 is designed to be used in a system in which CLK1 has a lower frequency than CLK2.

As shown in FIG. 7, clock switch 700 includes a first clock selection circuit 702, a second clock selection circuit 704, and a clock selection multiplexer 706 connected to each of first and second clock selection circuits 702 and 704. First clock selection circuit 702 is configured to receive SELECT_CLK2, CLK2 and a feedback signal ("CLK1_OFF") from second clock selection circuit 704 as input signals and to generate an output signal ("CLK2_ON") based on the state of those input signals. Second clock selection circuit 704 is configured to receive SELECT_CLK2 and CLK1 as input signals and to generate output signal CLK1_OFF based on the state of those input signals. Clock selection multiplexer 706 is configured to receive CLK1, CLK2, CLK2_ON and CLK1_OFF as input signals and to generate CLOCK_OUT based on the state of those input signals.

It should be noted that although CLK1_OFF is fed back as an input signal to first clock selection circuit 702, no output signal from first clock selection circuit 702 is fed back as an input signal to second clock selection circuit 704. Consequently, clock switch 700 does not utilize a cross-coupled feedback loop as is used in prior art clock switches. Such cross-coupled feedback loops render prior art clock switches unfriendly for testing purposes and potentially generate race conditions in the switch.

The structure and operation of each of first clock selection circuit 702, second clock selection circuit 704 and clock selection multiplexer 706 will now be further described.

As shown in FIG. 7, first clock selection circuit 702 includes a logic gate 710, a synchronization circuit 712, and a selection enablement circuit 714 connected in a serial fashion. Logic gate 710 is configured to receive SELECT_CLK2 and CLK1_OFF as input signals and to generate an output signal based on the state of those input signals. In particular, logic gate 710 is configured to generate an output signal having a logic high state only when SELECT_CLK2 and CLK1_OFF are both in a logic high state. This has the beneficial effect of preventing CLK2 from being selected as the output clock until such time as the selection of CLK1 as the output clock has been disabled, thus avoiding glitches on the output of clock switch 700. In an embodiment, logic gate 710 is an AND gate. However, as will be appreciated by persons skilled in the relevant art(s), other logic elements can be substituted to perform the function of logic gate 710.

Synchronization circuit 712 is configured to receive the output of logic gate 710 and CLK2 as input signals and to latch the output of logic gate 710 in a manner that is dependent on CLK2. The purpose of synchronization circuit 712 is to stabilize the output of logic gate 710 before providing it to selection enablement circuit 714. This helps to minimize any meta-stability that may arise due to the asynchronous nature of signals CLK1_OFF, SELECT_CLK2 and CLK2. In an embodiment of the present invention, synchronization circuit 712 is a single flip-flop that is configured to latch the output of logic gate 710 on a rising edge of CLK2. In alternate embodiments, synchronization circuit 712 comprises two or more flip-flops connected in a serial fashion, the first of which is configured to latch the output of logic gate 710 on a rising edge of CLK2, and the remainder of which are configured to latch the output of the preceding flip-flop in the series on a rising edge of CLK2. The number of flip-flops used to implement synchronization circuit 712 may be varied to account for varying differences between the speeds of CLK1 and CLK2.

Selection enablement circuit 714 is configured to receive the output of synchronization circuit 712 and CLK2 as input signals and to latch the output of synchronization circuit 712 in a manner that is dependent on CLK2. In an embodiment of the present invention, selection enablement circuit 714 is a single flip-flop that is configured to latch the output of synchronization circuit 712 on a falling edge of CLK2. Latching the output of synchronization circuit 712 in this manner ensures that the propagation of CLK2 to the output of clock switch 700 is not turned off while CLK2 is at a high level, thereby avoiding chopping of the output clock. As shown in FIG. 7, the data latched within selection enablement circuit 714 is provided as the output signal CLK1_ON to clock selection multiplexer 706.

As further shown in FIG. 7, second clock selection circuit 704 includes an optional synchronization circuit 720 and a selection enablement circuit 722 connected in a serial fashion. Unlike first clock selection circuit 702, second clock selection circuit 704 is not configured to pass SELECT_CLK2 only upon receiving a feedback signal that indicates that the selection of the other clock source has been disabled. Since, as noted above, clock switch 700 is designed to be used in a system in which CLK2 is faster than CLK1, and since the disabling of the selection of CLK2 by first clock selection circuit 702 is driven by CLK2, it may be assumed that the disabling of the selection of CLK2 by first clock selection circuit 702 will always occur before second clock selection circuit 704 can enable the selection of CLK1. However, the number of registers used to implement synchronization circuit 712 of first clock selection circuit 702 and optional synchronization circuit 720 of second clock selection circuit 704 must be carefully chosen so that the delay imposed by synchronization circuit 712 does not so far exceed any delay imposed by optional synchronization circuit 720 so as to render this assumption untrue.

As noted above, synchronization circuit 720 is optional. However, this is only true in an embodiment in which CLK1 and SELECT_CLK2 are synchronous signals (such as in clock switch 800 of FIG. 8, to be described in more detail below). If CLK1 and SELECT_CLK2 are asynchronous, then synchronization circuit 720 should be used to minimize any meta-stability that may arise from the logical combination of those signals. Even where CLK1 and SELECT_CLK2 are synchronous, synchronization circuit 720 may nevertheless be needed to ensure that the selection of CLK2 is disabled before the selection of CLK1 is enabled in clock switch 700. This may occur in an embodiment in which CLK1 and CLK2 are close in frequency, such as the embodiment described below in reference to FIG. 8.

In an embodiment in which synchronization circuit 720 is used, that circuit is configured to receive SELECT_CLK2 and CLK1 as input signals and to latch SELECT_CLK2 in a manner that is dependent on CLK1. In an embodiment of the present invention, synchronization circuit 720 is a single flip-flop that is configured to latch SELECT_CLK2 on a rising edge of CLK1. In alternate embodiments, synchronization circuit 720 comprises two or more flip-flops connected in a serial fashion, the first of which is configured to latch SELECT_CLK2 on a rising edge of CLK1, and the remainder of which are configured to latch the output of a preceding flip-flop in the series on a rising edge of CLK1.

Selection enablement circuit 722 is configured to latch SELECT_CLK2 or the output of synchronization circuit 720 in a manner that is dependent on CLK1. In an embodiment of the present invention, selection enablement circuit 722 is a single flip-flop that is configured to latch SELECT_CLK2 or the output of synchronization circuit 720 on a falling edge of CLK1. Latching in this manner ensures that the propagation of CLK1 to the output of clock switch 700 is not turned off while CLK1 is at a high level, thereby avoiding chopping of the output clock. As shown in FIG. 7, the data latched within selection enablement circuit 722 is provided as the output signal CLK1_OFF to clock selection multiplexer 706.

Clock selection multiplexer 706 includes a first logic gate 730, a second logic gate 732, and a third logic gate 734 connected to first and second logic gates 730 and 732. First logic gate 730 is configured to receive CLK2_ON and CLK2 as input signals and to generate an output signal based on the state of those input signals. In particular, first logic gate 730 is configured to generate an output signal having a logic high state only when CLK2_ON and CLK2 are both in a logic high state. This has the effect of passing CLK2 to logic gate 734 only when CLK2_ON has been placed in a logic high state by first clock selection path 702. In an embodiment, first logic gate 730 is an AND gate. However, as will be appreciated by persons skilled in the relevant art(s), other logic elements can be substituted to perform the function of first logic gate 730.

Second logic gate 732 is configured to receive CLK1_OFF and CLK1 as input signals and to generate an output signal based on the state of those input signals. As shown in FIG. 3, CLK1_OFF is received at an inverting input of logic gate 732. Second logic gate 732 is configured to generate an output signal having a logic high state only when CLK1_OFF is in a logic low state and CLK1 is in a logic high state. This has the effect of passing CLK1 to logic gate 734 only when CLK1_OFF has been placed in a logic low state by second clock selection path 704. In an embodiment, second logic gate 732 is an AND gate. However, as will be appreciated by persons skilled in the relevant art(s), other logic elements can be substituted to perform the function of second logic gate 732.

Third logic gate 734 is configured to receive the outputs of first logic gate 730 and second logic gate 732 as input signals and to generate an output signal based on the state of those input signals. In particular, third logic gate 734 is configured to generate an output signal having a logic high state when either of the outputs from first logic gate 730 or second logic gate 732 is in a logic high state. This has the effect of permitting either CLK2 (which is passed by logic gate 730 when CLK2_ON is high) or CLK1 (which is passed by logic gate 732 when CLK1_OFF is low) to control the output of third logic gate 734, which is the ultimate clock output signal CLOCK_OUT of clock switch 700.

Figure 8:
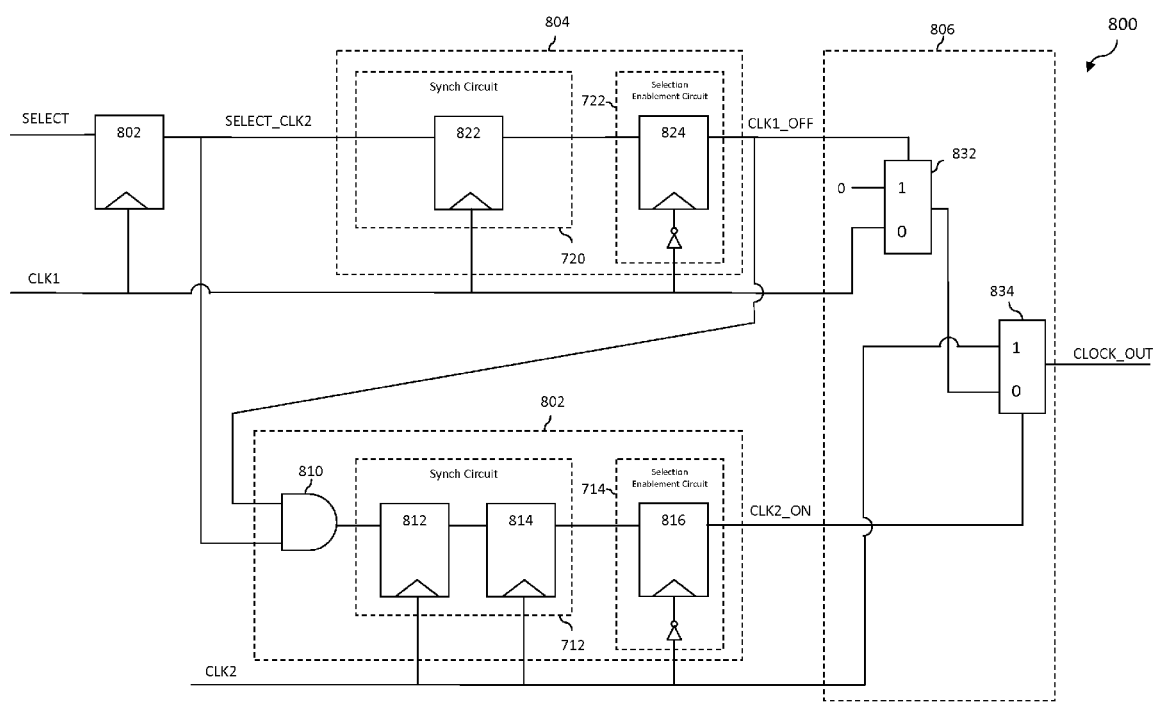
FIG. 8 is a block diagram that illustrates one manner of implementing the clock switch of FIG. 7.

FIG. 8 is a block diagram of a clock switch 800 that represents one manner of implementing clock switch 700 of FIG. 7. Clock switch 800 is described herein by way of example only and is not intended to limit the present invention.

As shown in FIG. 8, clock switch 800 includes a flip-flop 802 that is configured to generate SELECT_CLK2 by latching a clock selection signal ("SELECT") on a rising edge of CLK1. As a result, CLK1 and SELECT_CLK2 are synchronous signals. In one embodiment of the present invention, clock switch 800 is part of a processor-based system or device and CLK1 is the processor clock, or is otherwise derived from the processor clock.

As shown in FIG. 8, synchronization circuit 712 comprises a first flip-flop 812 and a second flip-flop 814 arranged in series, each of which is triggered by a rising edge of CLK2. This arrangement of flip-flops provides extra protection against any meta-stability that may arise due to the asynchronous nature of signals CLK1_OFF and CLK2. In contrast, synchronization circuit 720 comprises only a single flip-flop 822, which is triggered by a rising edge of CLK1. Flip-flop 822 is not needed to protect against meta-stability in second clock selection circuit 704, since CLK1 and SELECT_CLK2 are synchronous signals. However, flip-flop 822 is nevertheless used to ensure that the selection of CLK2 is disabled before the selection of CLK1 is enabled in clock switch 800, as will be demonstrated below in reference to the timing diagram of FIG. 9.

As further shown in FIG. 8, selection enablement circuit 714 is implemented as a single flip-flop 816 with an inverter coupled between CLK2 and the clock input of flip-flop 816. This ensures that flip-flop 816 will only latch the output of synchronization circuit 712 on a falling edge of CLK2. Likewise, selection enablement circuit 722 is implemented as a single flip-flop 824 with an inverter coupled between CLK1 and the clock input of flip-flop 824. This ensures that flip-flop 824 will only latch the output of synchronization circuit 720 on a falling edge of CLK1.

In clock switch 800 of FIG. 8, clock selection multiplexer 806 is implemented using a first multiplexer 832 and a second multiplexer 834. First multiplexer 832 is configured to output CLK1 when CLK1_OFF is in a logic low state and to output a logic low signal when CLK1_OFF is in a logic high state. Second multiplexer 834 is configured to output the output of first multiplexer 832 when CLK2_ON is in a logic low state and to output CLK2 when CLK2_ON is in a logic high state. This arrangement is the logical equivalent of the arrangement of logic gates 730, 732 and 734 shown in FIG. 7.

Figure 9:
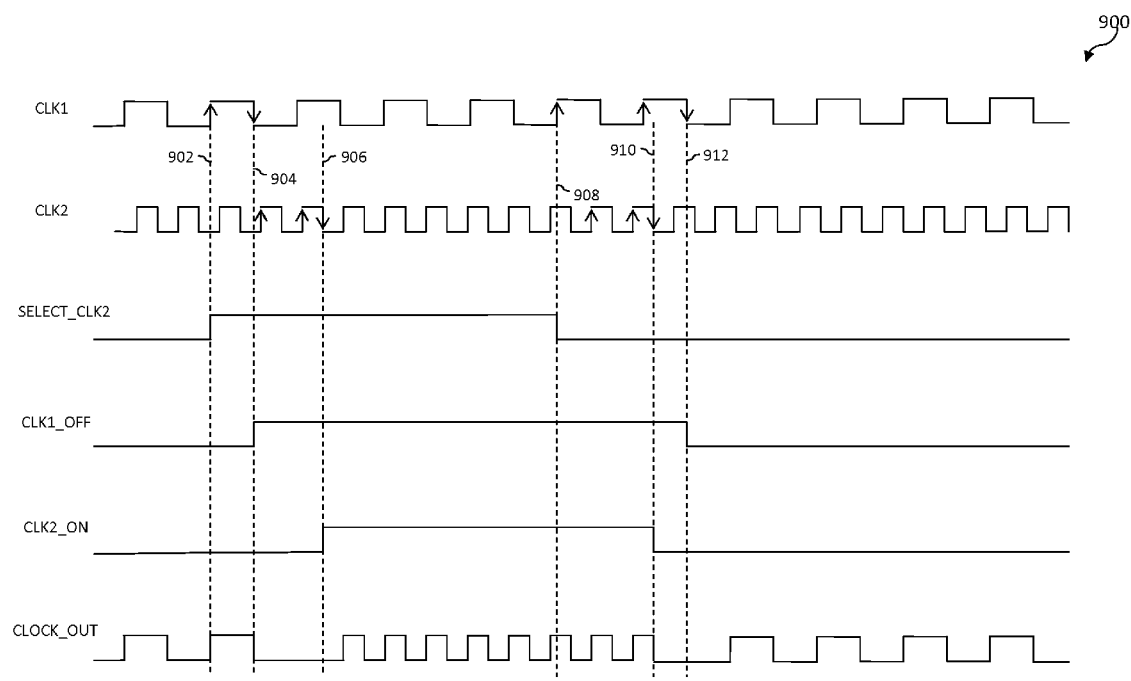
FIG. 9 is a diagram illustrating the state of various signals received or generated by the clock switch of FIG. 8 over time.

FIG. 9 is a timing diagram 900 that shows the states of signals CLK1, CLK2, SELECT_CLK2, CLK1_OFF, CLK2_ON and CLOCK_OUT during a change-over from slower clock source CLK1 to faster clock source CLK2 and then back to CLK1 again in clock switch 800 of FIG. 8. Timing diagram 900 is provided to aid in the understanding of the operation of clock switch 800 of FIG. 8.

As shown in FIG. 9, before a point in time indicated by dashed line 902 ("time 902"), SELECT_CLK2 is in a logic low state and CLOCK_OUT thus reflects the state of CLK1. At time 902, SELECT_CLK2 transitions to a logic high state on a rising edge of CLK1 due to the operation of flip-flop 802. However, when SELECT_CLK2 transitions to a logic high state at time 902, the state of CLOCK_OUT does not immediately change. Rather, the propagation of CLK1 to the output of clock switch 800 continues until a subsequent time 904 after one rising edge and one falling edge of CLK1 due to the operation of flip-flops 822 and 824. At this point CLK1_OFF transitions to a logic high state, thereby disabling the propagation of CLK1 to the output of the clock switch. Then, propagation of CLK2 is started at a further subsequent time 906 after two rising edges and one falling edge of CLK2 due to the further operation of flip-flops 812, 814 and 816 responsive to CLK1_OFF going high. At this point, CLOCK_OUT begins reflecting the state of CLK2.

At a next point in time 908, SELECT_CLK2 transitions back to a logic low state on a rising edge of CLK1 due to the operation of flip-flop 802.

However, when SELECT_CLK2 transitions to a logic low state at time 908, the state of CLOCK_OUT does not immediately change. Rather, the propagation of CLK2 to the output of clock switch 800 continues until a subsequent time 910 after two rising edges and one falling edge of CLK2 due to the operation of flip-flops 812, 814 and 816. At this point, CLK2_ON transitions to a logic low state, thereby disabling the propagation of CLK2 to the output of the clock switch.

After time 908, while SELECT_CLK2 is propagating through flip-flops 812, 814, and 816, it is also concurrently propagating through flip-flops 822 and 824. This is due to the fact that there is no inhibiting feedback loop from first clock selection circuit 702 to second clock selection circuit 704. As a result, one rising edge and one falling edge of CLK1 after SELECT_CLK2 transitions to a logic low state at time 908, CLK1_OFF transitions to a logic low state at time 912. At this point, CLOCK_OUT begins reflecting the state of CLK1 again.

It can be seen from timing diagram 900 that if flip-flop 822 were not included in the design of clock switch 800, then CLK1_OFF would transition to a logic low state one cycle of CLK1 earlier, in which case the selection of CLK1 and CLK2 would be enabled at the same time, resulting in a glitch in CLOCK_OUT. Thus, even though flip-flop 822 is not required for preventing meta-stability in clock switch 800, it is nevertheless needed to prevent glitches on the clock output line. This is due to the fact that the frequencies of CLK1 and CLK2 are relatively close. If the frequency difference were greater (e.g., if the frequency of CLK1 were two or more times slower than the frequency of CLK2), then flip-flop 822 could be removed without creating the possibility of glitches.

One additional benefit of the implementation of clock switch 800 shown in FIG. 8 is that reset pins are not required on the flip-flops as required by the prior art design discussed above in reference to FIG. 1. As long as the state of SELECT_CLK2 is known (and perhaps using a reset pin on its source, such as on flip-flop 802), then CLOCK_OUT will settle to a proper state via operation of circuit switch 800 itself when power is first applied.

FIG. 6 depicts a flowchart 600 of a method for generating a multi-frequency clock signal in accordance with an embodiment of the present invention. As shown in flowchart 600, the method comprises a series of steps. However, persons skilled in the relevant art(s) will readily appreciate that the steps of flowchart 600 need not occur in a serial fashion and that such steps may occur concurrently or in some other order not shown in FIG. 6. The method of flowchart 600 will now be described with reference to clock switch 700 of FIG. 7 and clock switch 800 of FIG. 8, although the method is not limited to those implementations.

The method of flowchart 600 begins at step 602, in which a first clock selection circuit (first clock selection circuit 702) receives a first clock signal (CLK2), a clock selection signal (SELECT_CLK2) and a feedback signal (CLK1_OFF) from a second clock selection circuit (second clock selection circuit 704). At step 604, the first clock selection circuit (first clock selection circuit 702) generates a first clock selection signal (CLK2_ON) based on the state of the first clock signal (CLK2), the clock selection signal (SELECT_CLK2), and the feedback signal (CLK1_OFF).

At step 606, the second clock selection circuit (second clock selection circuit 704) receives a second clock signal (CLK1) and the clock selection signal (SELECT_CLK2). At step 608, the second clock selection circuit (second clock selection circuit 704) generates a second clock selection signal (CLK1_OFF) based only on the state of the second clock signal (CLK1) and the clock selection signal (SELECT_CLK2).

At step 610, a clock selection multiplexer (clock selection multiplexer 706) receives the first clock signal (CLK2), the second clock signal (CLK1), the first clock selection signal (CLK2_ON) and the second clock selection signal (CLK1_OFF). At step 612, the clock selection multiplexer (clock selection multiplexer 706) passes either the first clock signal (CLK2) or the second clock signal (CLK1) to a clock output (CLOCK_OUT) based on the state of the first clock selection signal (CLK2_ON) and the second clock selection signal (CLK1_OFF).

The foregoing method is applicable in an embodiment in which the first clock signal (CLK2) has a higher frequency than the second clock signal (CLK1). The method is particularly useful where the first clock signal (CLK2) and the second clock signal (CLK1) are asynchronous, although the invention is not limited to such an embodiment.

Step 604 of generating a first clock selection signal may include gating the propagation of the clock selection signal (SELECT_CLK2) by a logic gate (logic gate 710) based on the state of the feedback signal (CLK1_OFF). Step 604 may also include latching the clock selection signal (SELECT_CLK2) in one or more flip-flops (e.g., flip-flops 812 and 814) on a rising edge of the first clock signal (CLK2). Step 604 may further include latching the clock selection signal (SELECT_CLK2) in a flip-flop (e.g., flip-flop 816) on a falling edge of the first clock signal (CLK2).

Step 608 of generating a second clock selection signal may include latching the clock selection signal (SELECT_CLK2) in one or more flip flops (e.g., flip-flop 822) on a rising edge of the second clock signal (CLK1). Step 608 may also include latching the clock selection signal (SELECT_CLK2) in a flip-flop (e.g., flip-flop 824) on a falling edge of the second clock signal (CLK1).

In an embodiment in which the clock selection signal (SELECT_CLK2) and the second clock signal (CLK1) are synchronous, step 608 may include only latching the clock selection signal (SELECT_CLK2) in a flip-flop (e.g., flip-flop 824) on a falling edge of the second clock signal (CLK1).

C. Conclusion

While various embodiments of the present invention have been described above, it should be understood that they have been presented by way of example only, and not limitation. For example, although clock switches 300, 400, 700 and 800 have been described above as including certain digital circuits (e.g., logic gates, flip flops and multiplexers), persons skilled in the relevant art(s) will readily appreciate that other circuits may be substituted for those described herein that will perform the same or similar functions. Accordingly, the present invention should not be limited to the particular digital circuits described herein, but should be understood to more broadly encompass any circuits which perform a like function to those described.

It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for generating a multi-frequency clock signal, comprising:
    receiving a first clock signal, a clock selection signal, and a feedback signal from a second clock selection circuit in a first clock selection circuit;
    generating a first clock selection signal based on the state of the first clock signal, the clock selection signal, and the feedback signal;
    receiving a second clock signal and the clock selection signal in the second clock selection circuit;
    generating a second clock selection signal based only on the state of the second clock signal and the clock selection signal;
    receiving the first clock signal, the second clock signal, the first clock selection signal and the second clock selection signal in a multiplexer; and
    passing either the first clock signal or the second clock signal to a clock output based on the state of the first clock selection signal and the second clock selection signal;
    wherein the first clock signal has a higher frequency than the second clock signal.

2. The method of claim 1, wherein the first and second clock signals are asynchronous.

3. The method of claim 1, wherein generating a first clock selection signal comprises gating the propagation of the clock selection signal based on the state of the feedback signal.

4. The method of claim 1, wherein generating a first clock selection signal comprises latching the clock selection signal on a rising edge of the first clock signal.

5. The method of claim 4, wherein generating a first clock selection signal further comprises latching the clock selection signal on a falling edge of the first clock signal.

6. The method of claim 1, wherein generating a second clock selection signal comprises latching the clock selection signal on a rising edge of the second clock signal.

7. The method of claim 6, wherein generating a second clock selection signal further comprises latching the clock selection signal on a falling edge of the second clock signal.

8. The method of claim 1, wherein the clock selection signal and the second clock signal are synchronous and wherein generating a second clock selection signal comprises only latching the clock selection signal on a falling edge of the second clock signal.

9. A clock switch for generating a multi-frequency clock, comprising:
- a first clock selection circuit configured to receive a first clock signal, a clock selection signal, and a feedback signal from a second clock selection circuit and to generate a first clock selection signal based on the state of the first clock signal, the clock selection signal, and the feedback signal;
- a second clock selection circuit configured to receive a second clock signal and the clock selection signal and to generate a second clock selection signal based only on the state of the second clock signal and the clock selection signal; and
- a clock selection multiplexer configured to receive the first clock signal, the second clock signal, the first clock selection signal and the second clock selection signal and to pass either the first clock signal or the second clock signal to a clock output based on the state of the first clock selection signal and the second clock selection signal;
- wherein the first clock signal has a higher frequency than the second clock signal.

10. The clock switch of claim 9, wherein the first and second clock signals are asynchronous.

11. The clock switch of claim 9, wherein the first clock selection circuit includes a logic gate configured to gate the propagation of the clock selection signal based on the state of the feedback signal.

12. The clock switch of claim 9, wherein the first clock selection circuit includes at least one flip-flop that is configured to latch the clock selection signal on a rising edge of the first clock signal.

13. The clock switch of claim 12, wherein the first clock selection circuit further includes a flip-flop that is configured to latch the clock selection signal on a falling edge of the first clock signal.

14. The clock switch of claim 9, wherein the second clock selection circuit includes at least one flip-flop that is configured to latch the clock selection signal on a rising edge of the second clock signal.

15. The clock switch of claim 14, wherein the second clock selection circuit further includes a flip-flop that is configured to latch the clock selection signal on a falling edge of the second clock signal.

16. The clock switch of claim 9, wherein the clock selection signal and the second clock signal are synchronous and wherein the second clock selection circuit consists of a flip-flop that is configured to latch the clock selection signal on a falling edge of the second clock signal.

17. A system for generating a multi-frequency clock signal, comprising:
- a first clock source configured to generate a first clock signal;
- a second clock source configured to generate a second clock signal that has a lower frequency than the first clock signal; and
- a clock switch circuit, including:
  - a first clock selection circuit configured to receive the first clock signal, a clock selection signal, and a feedback signal from a second clock selection circuit and to generate a first clock selection signal based on the state of the first clock signal, the clock selection signal, and the feedback signal;
  - a second clock selection circuit configured to receive the second clock signal and the clock selection signal and to generate a second clock selection signal based only on the state of the second clock signal and the clock selection signal; and
  - a clock selection multiplexer configured to receive the first clock signal, the second clock signal, the first clock selection signal and the second clock selection signal and to pass either the first clock signal or the second clock signal to a clock output based on the state of the first clock selection signal and the second clock selection signal.

18. The system of claim 17, wherein the first and second clock signals are asynchronous.

19. The system of claim 17, wherein the first clock selection circuit includes a logic gate configured to gate the propagation of the clock selection signal based on the state of the feedback signal.

20. The system of claim 17, wherein the first clock selection circuit includes at least one flip-flop that is configured to latch the clock selection signal on a rising edge of the first clock signal.

21. The system of claim 20, wherein the first clock selection circuit further includes a flip-flop that is configured to latch the clock selection signal on a falling edge of the first clock signal.

22. The system of claim 17, wherein the second clock selection circuit includes at least one flip-flop that is configured to latch the clock selection signal on a rising edge of the second clock signal.

23. The system of claim 17, wherein the second clock selection circuit further includes a flip-flop that is configured to latch the clock selection signal on a falling edge of the second clock signal.

24. The system of claim 17, wherein the clock selection signal and the second clock signal are synchronous and wherein the second clock selection circuit consists of a flip-flop that is configured to latch the clock selection signal on a falling edge of the second clock signal.

* * * * *